March 7, 1950 — E. P. PALMATIER — 2,499,832
SYSTEM FOR SUPPLYING HEATED AIR FOR USE ON AIRCRAFT
Original Filed Sept. 20, 1943
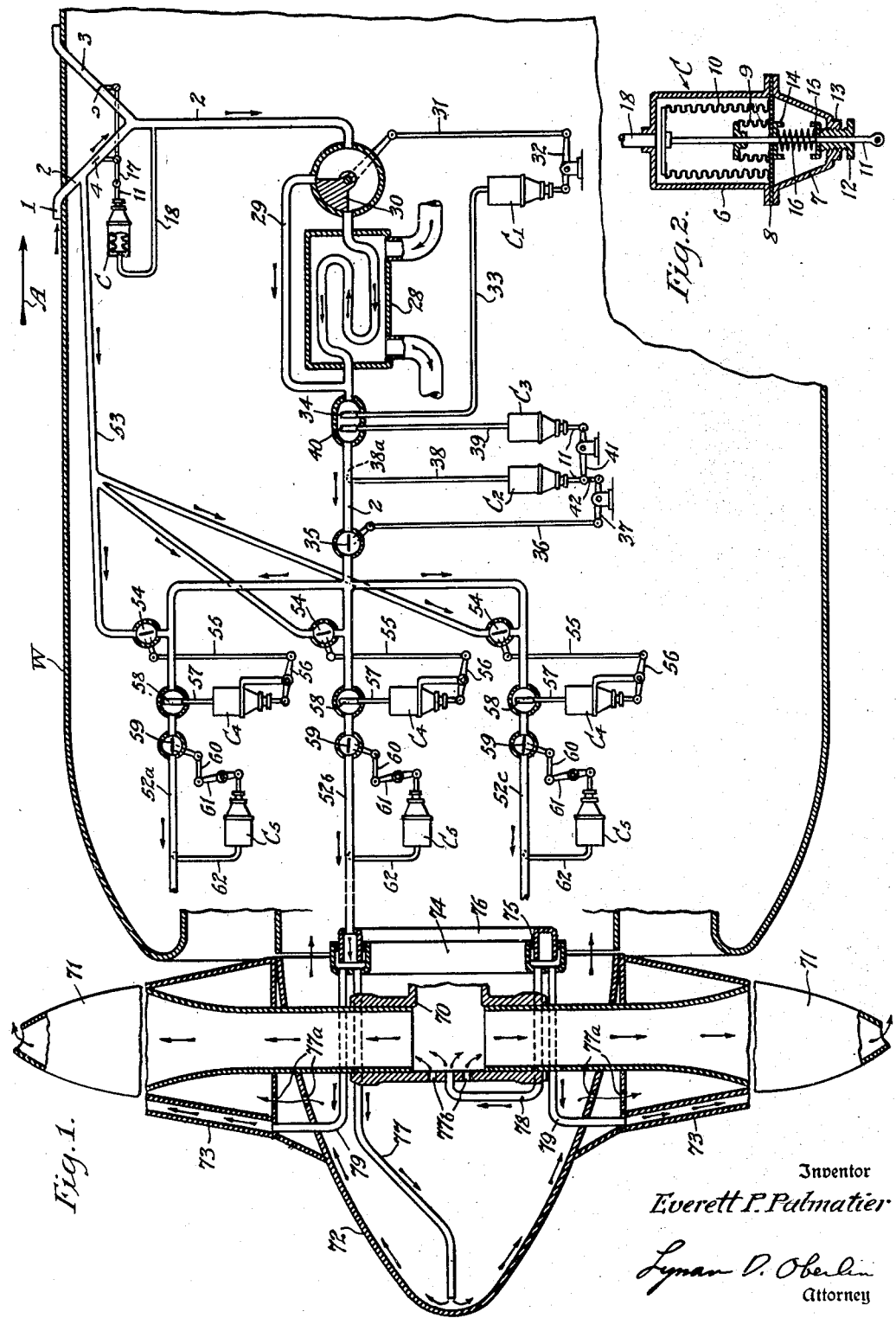
Inventor
Everett P. Palmatier
Lyman D. Oberlin
Attorney Patented Mar. 7, 1950

2,499,832

UNITED STATES PATENT OFFICE 2,499,832

SYSTEM FOR SUPPLYING HEATED AIR FOR USE ON AIRCRAFT

Everett P. Palmatier, Solvay, N. Y., assignor to Curtiss-Wright Corporation, a corporation of Delaware Original application September 20, 1943, Serial No. 503,143. Divided and this application May 2, 1945, Serial No. 591,605

6 Claims. (Cl. 257—2)

My invention relates to systems for supplying heated air for use on aircraft.

My invention has reference to a system for supplying heated air for use as stated, said system comprising a pipe traversed by heated air and utilizable as a supply source of heated air for a plurality of secondary pipes leading, respectively, to desired locations on the aircraft.

More particularly, in accordance with my invention, a control or controls is or are effected on one or more conditions such, for example, as quantity and/or temperature of the streams of air traversing the aforesaid secondary pipes.

Various other objects, advantages and features of my invention will become apparent from the following detailed description.

My invention resides in the heat-exchange system, novel control features, arrangements and combinations of the character hereinafter described and claimed.

This application is a division of application Serial No. 503,143, filed September 20, 1943.

For an understanding of my invention and for an illustration of one of the forms thereof, reference is to be had to the accompanying drawings, in which:

Figure 1 is a schematic view showing the supply system of my invention; and

Fig. 2 is a sectional view illustrating a control mechanism included in my novel system.

Referring to Fig. 1, I have shown an aircraft surface W which, for example, may be the forward surface of a wing. Projecting in the normal direction of aircraft flight is an air scoop 1 adapted to supply air to a pipe 2 having branching therefrom an upwardly extending pipe 3 which terminates above the surface W at the rear of the air scoop 1. Disposed in the pipes 2 and 3 are the respective valves 4 and 5 which are operated by control mechanism C of the character shown in Fig. 2.

The control mechanism C may be of any suitable character and, as illustrated, it comprises a pair of housings 6, 7 secured to each other in flanged relation and separated from each other by a plate 8. Secured to the plate 8 are the inner and outer bellows 9 and 10 forming sealed chambers, respectively, and having a depending rod 11 secured to the upper plate of each, said rod 11 being slidably mounted in and with respect to the aforesaid plate 8 and also with respect to a nut 12 which is threaded through a member 13 secured to and closing the lower surface of the housing 7. Within said housing 7, the rod 11 has secured thereto a disk 14 which faces a similar disk 15 mounted on the nut 12. The rod 11 is slidable with respect to the disk 15 last named and, confined between the two disks 14 and 15, is a helical spring 16 which biases the rod 11 in an upward direction.

As shown in Fig. 1, the rod 11 of the control mechanism C has connected thereto a member 17 to which each of the valves 4 and 5 is connected. Communicating with the chamber defined by the exterior surface of the bellows 10 and the interior surface of the housing 6 is a pipe 18 which communicates with the aforesaid pipe 2 beyond the junction thereof with the pipe 3. Accordingly, assuming that the arrow A indicates the relative motion of the air with respect to the surface W, the valves 4 and 5 are responsive to the intake pressure of the air passing through the pipe 2.

The pipe 2 extends through a suitable heating zone exemplified, in the example shown but not necessarily, by a housing 28 having inlet and outlet ports traversed by the hot exhaust gases from the aircraft engine, convolutions of the pipe 2 being suitably arranged in said housing 28.

A pipe 29 communicates with the pipe 2 adjacent the entrance side of the heat-exchange zone. This pipe 29 by-passes said heat-exchange zone and is disposed in communicating relation with the pipe 2 adjacent the exit side of the heat-exchange zone. Disposed at the juncture of the pipes 2 and 29, at the entrance side of the heat-exchange zone, is a valve 30 adapted to be actuated by a link 31 pivoted to the lever 32 of a control mechanism C1 which is a duplicate of the control mechanism illustrated in Fig. 2. As regards the control mechanism C1, a pipe 33 replaces the pipe 18 of the control mechanism C, said pipe 33 terminating in a thermal bulb 34 disposed in the pipe 2 beyond the junction thereof with the discharge end of the pipe 29, the bulb 34, the pipe 33 and the space in the associated housing 6 exteriorly of the outer bellows 10 being filled with a suitable control medium, either vapor, liquid or a gas.

The pipe 2, adjacent the discharge end thereof, has disposed therein a valve 35 which is controlled jointly by the quantity of air traversing the pipe 2 and by the temperature of such air. Accordingly, the valve 35 has connected thereto a link 36 which is pivoted to a suitably supported lever 37 controlled by a pair of control mechanisms C2 and C3 of the character illustrated in Fig. 2. As regards the control mechanism C2, a pipe 38 replaces the pipe 18 of the control mechanism C, said pipe 38 terminating in an angular section 38a disposed in a section of the pipe 2 beyond the junction thereof with the discharge end of the pipe 29. This angular pipe section 38a faces the stream of oncoming air and said pipe 38 communicates with the chamber defined by the exterior surface of the associated bellows 10 and the interior surface of the associated housing 6. Hence, the rod 11 of the control mechanism C2 varies in position in accordance with the quantity of the air passing through the pipe 2.

As regards the control mechanism C3, a pipe 39 replaces the pipe 18 of the control mechanism C, said pipe 39 terminating in a bulb 40 disposed in a section of the pipe 2 beyond the junction thereof with the discharge end of the pipe 29, the bulb 40, the pipe 39 and the space in the associated housing 6 exteriorly of the outer bellows 10 being filled with a suitable control medium, for example, as hereinbefore described. Hence, the rod 11 of the control mechanism C3 varies in position in accordance with the temperature of the air passing through said last named section of the pipe 2.

The rods 11 of the aforesaid pair of control mechanisms C2 and C3 are pivoted, respectively, to the opposite ends of a lever 41 which by a link 42, is pivoted to the aforesaid lever 37. Accordingly, the lever 37, link 36 and the valve 35 take a position which is dependent jointly upon the temperature of the air and the quantity of air passing through a section of the pipe 2 beyond the juncture thereof with the aforesaid pipe 29.

As regards the form of my invention herein disclosed, the control mechanism C for the valves 4 and 5 holds these valves in such respective positions that the intake pressure of the air passing through the pipe 2 beyond the junction thereof with the pipe 3 has a desired value. In case this intake pressure becomes too high, the control mechanism C operates to move the valve 4 to a more closed position and the valve 5 to a more open position. Should such intake pressure become too low, an operation the reverse of that described is effected on the valves 4 and 5.

The control mechanism C1 for the valve 30 is operated in accordance with the temperature of the air passing through that section of the pipe 2 beyond the heat-exchange zone. In case the temperature of the air passing through said last named pipe section becomes too high, the control mechanism C1 moves the valve 30 to such position that more of the air by-passes the heat-exchange zone by way of the pipe 29. Should the temperature of the air in said last named pipe section become too low, an operation is performed the reverse of that described whereby the pipe 29 is throttled to cause more air to pass through the heat-exchange zone.

As hereinbefore stated, the position of the valve 35 is determined jointly by the quantity of air passing through that section of the pipe 2 beyond the junction thereof with the pipe 29 and also by the temperature of the air passing through said last named pipe section.

In the disclosed form of the invention, a plurality of pipes 52a, 52b and 52c communicate with the discharge end of the pipe 2 and, as a result, each of the pipes 52a, 52b and 52c is traversed by a secondary stream of heated air.

A pipe 53 is connected to the hereinbefore described pipe 4 and said pipe 53 terminates in branches communicating with the respective pipes 52a, 52b and 52c. Each branch of the pipe 53 has disposed therein a valve 54 which, by a link 55, is connected to the lever 56 of a control mechanism C4 which may be a duplicate of the control mechanism illustrated in Fig. 2. Each control mechanism C4 has one end of a pipe 57 communicating with the chamber defined by the exterior surface of the bellows 10 and the interior surface of the housing 6, the other end of said pipe 57 terminating in a bulb 58, these bulbs 58 being disposed in the respective pipes 52a, 52b and 52c. The space within the bulb 58, pipe 57 and the housing 6 exteriorly of the outer bellows 10 of each control mechanism C4 is filled with a suitable control medium such, for example, as hereinbefore described.

Each of the aforesaid pipes 52a, 52b and 52c, in the section thereof beyond the associated bulb 58, has included therein a valve 59 which, by a link 60, is connected to the lever 61 of a control mechanism C5 which may be a duplicate of the control mechanism shown in Fig. 2. Each control mechanism C5 has one end of a pipe 62 communicating with the chamber defined by the exterior surface of the outer bellows 10 and the interior surface of the housing 6, the other angular open end of said pipe 62 facing the oncoming stream of heated air in each of the pipes 52a, 52b and 52c beyond the respective valves 59.

As regards the pipe 52a, for example, it will be understood that, should the air traversing the same become too hot, the lever 56 of the associated control mechanism C4 moves the link 55 upwardly to thereby move the associated valve 54 to a more open position. In so doing, cool air is admitted to the pipe 52a by way of the pipe 53 and, therefore, the temperature of the heated air in said pipe 52a is lowered.

Should the quantity of air traversing the pipe 52a last named be too large, the associated control mechanism C5 actuates the lever 61 and link 60 to thereby move the associated valve 59 to a more closed position.

It will be understood in view of the foregoing description that the streams of heated air traversing the respective pipes 52b, 52c are controllable, as regards temperature and quantity, by the various control mechanisms in the same manner as described above with respect to the pipe 52a.

The streams of heated air emerging from the outlet end of the respective pipes 52a may be utilized for any suitable purpose on the aircraft as desired. For example, these streams of heated air may be utilized to heat any selected aircraft surface to prevent the formation of ice thereon or to melt ice which has already been formed thereon.

As illustrative of some uses of one of the streams of heated air, reference is to be had to Fig. 1 which, in a diagrammatic manner, shows a propeller hub 70 having angularly related sockets for the reception of the respective propeller blades 71. Associated with the hub 70 is a spinner 72 and, exteriorly thereof, cuffs 73 are disposed around the respective blades 71. The parts thus described are rotatable together as a unit. Suitably secured to these rotatable parts is an annular housing 74 maintained in sealed relation as at 75 with a second annular housing 76 suitably secured in fixed position with respect to the rotatable housing 74.

As shown, the outlet end of one of the pipes 52a, 52b or 52c, for example, the pipe 52b communicates with and discharges a main stream of heated air into the sealed chamber defined by the housings 74 and 76. Secured to the housing 74 for rotatable movement therewith and communicating with said chamber are four pipes 77, 78 and 79, 79 traversed, respectively, by secondary of streams of heated air. The pipe 77 passes heated air into the spinner 72 and, particularly, into engagement with the interior surface of said spinner 72 from which such heated air may pass into heat-transferring relation with the blade cuffs 73 by way of the respective passages 77a and, further, heated air from the spinner 72 may pass into the hollow blades 71 by way of passages 77b. The pipe 78 terminates interiorly of the hub 70 and conveys heated air into the space defined thereby, such heated air thereafter passing outwardly into and through the interior chambers defined by the respective propeller blades 71 each of which comprises an air-discharge passage at or near the end thereof. The pipes 79 are bent angularly and communicate with the respective chambers formed at the leading edges of the cuffs 73, to which they convey heated air from the chamber 75, 76.

From the foregoing description, it will be understood that the flow of air through the pipes 2, 52a, 52b and 52c is established and maintained in response to movement of the aircraft through the air. Obviously, a pump or equivalent, may be utilized for effecting such passage of air through the aforesaid pipes and, if desired, it will be understood that the pump may be utilized booster-fashion to increase the flow of air through said pipes.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a system of the character described, a main pipe through which a main stream of heated air flows under pressure, a plurality of secondary pipes communicating with said main pipe, each secondary pipe receiving a secondary stream of heated air from said main pipe, means responsive to the temperature of at least one stream of secondary air for controlling the temperature thereof, and means responsive to the pressure of said last named stream of secondary air for controlling the quantity thereof passing through its pipe.

2. In a system of the character described, a main pipe, an air scoop connected with said main pipe for causing a stream of air to flow therethrough under pressure, a second pipe branching from said main pipe and terminating in a section facing from said air scoop, means for exchanging heat between said stream of air and a source of heat, a plurality of secondary pipes communicating with said main pipe, each secondary pipe receiving a secondary stream of heated air from said main pipe, and a conduit extending from said main pipe for supplying cooling air to at least one stream of secondary air.

3. In a system of the character described, a main pipe, an air scoop connected with said main pipe for causing a stream of air to flow therethrough under pressure, a second pipe branching from said main pipe and terminating in a section facing from said air scoop, means for exchanging heat between said stream of air and a source of heat, a plurality of secondary pipes communicating with said main pipe, each secondary pipe receiving a secondary stream of heated air from said main pipe, a conduit extending from said main pipe for supplying cooling air to at least one stream of secondary air, a valve in said conduit, and means for controlling said valve.

4. In a system of the character described, a main pipe, an air scoop connected with said main pipe for causing a stream of air to flow therethrough under pressure, a second pipe branching from said main pipe and terminating in a section facing from said air scoop, means for exchanging heat between said stream of air and a source of heat, a plurality of secondary pipes communicating with said main pipe, each secondary pipe receiving a secondary stream of heated air from said main pipe, a conduit extending from said main pipe for supplying cooling air to at least one stream of secondary air, a valve in said conduit, and means responsive to the temperature of said last named stream of air for controlling said valve.

5. In a system of the character described, a main pipe through which a main stream of heated air flows under pressure, a plurality of secondary pipes communicating with said main pipe, each secondary pipe receiving a secondary stream of heated air from said main pipe, means responsive to the temperature of at least one stream of secondary air for controlling the temperature thereof, means responsive to the pressure of said last named stream of secondary air for controlling the quantity thereof passing through its pipe, and means responsive to the temperature and pressure of air delivered from said main pipe for controlling the temperature and pressure of air delivered thereby.

6. In a heated gas supply system a main pipe through which a supply of heated gas is forced, a plurality of branch pipes fed from said main pipe, means responsive to the temperature of gas delivered through at least one branch pipe for controlling the temperature of the gas flowing therethrough, means responsive to the gas delivery pressure of at least one branch pipe for controlling the quantity of gas passing therethrough, and means responsive to the pressure and temperature in said main pipe respectively operable to control the quantity and temperature of gas passing therethrough.

EVERETT P. PALMATIER.

REFERENCES CITED

The following references are of record in the file of this patent:

UNITED STATES PATENTS

| Number | Name | Date |
|---|---|---|
| 1,716,276 | Koch | June 4, 1929 |
| 2,202,995 | Porwancher | June 4, 1940 |
| 2,231,826 | Foss, 2nd | Feb. 11, 1941 |
| 2,327,664 | Otis | Aug. 24, 1943 |